June 3, 1941.  F. E. ARNDT  2,243,939
SPREADER
Filed Nov. 5, 1937  3 Sheets-Sheet 1

INVENTOR:
FRANKLIN E. ARNDT,
BY Chas. M. Nissen,
ATT'Y.

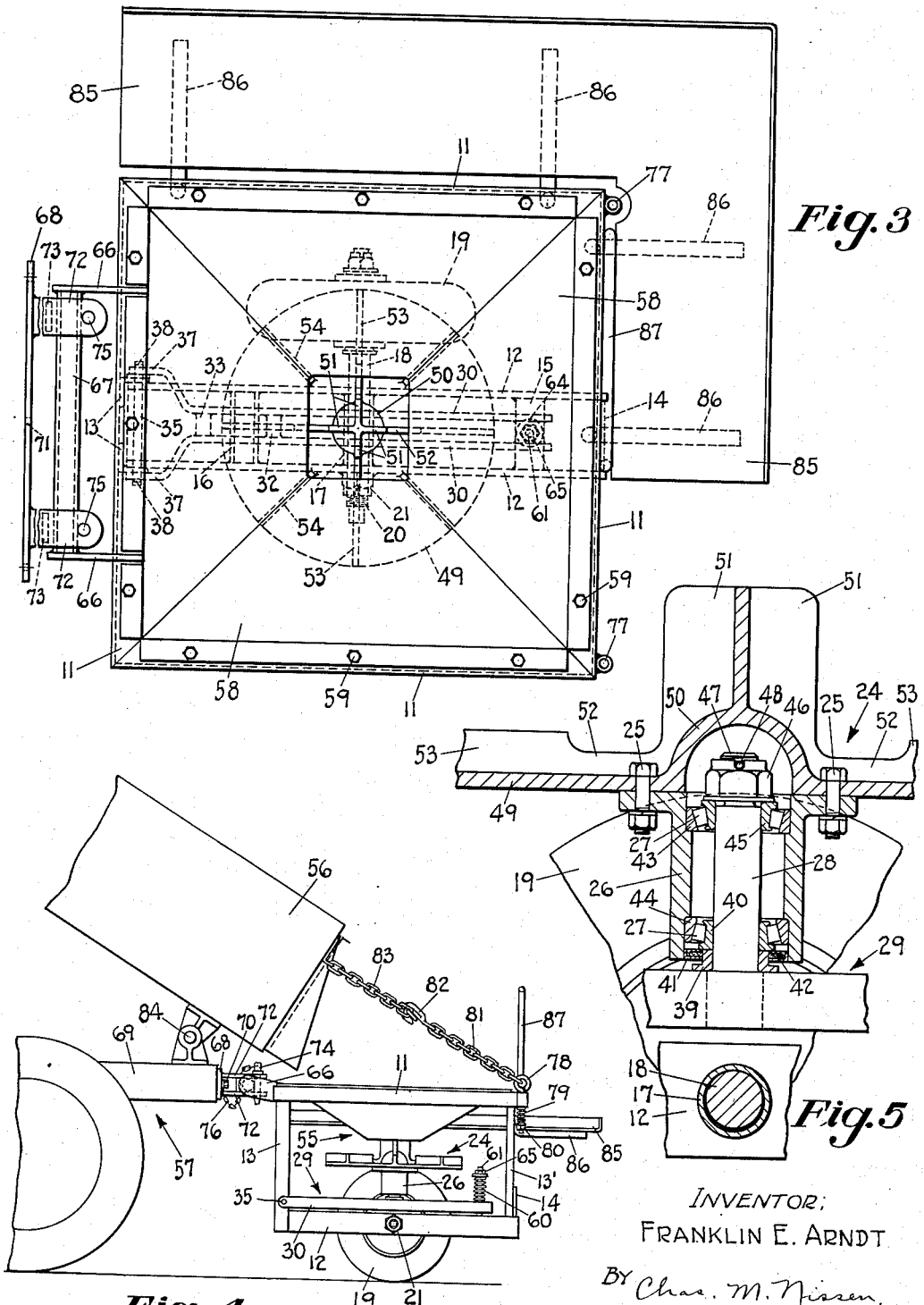

June 3, 1941.  F. E. ARNDT  2,243,939
SPREADER
Filed Nov. 5, 1937  3 Sheets-Sheet 3
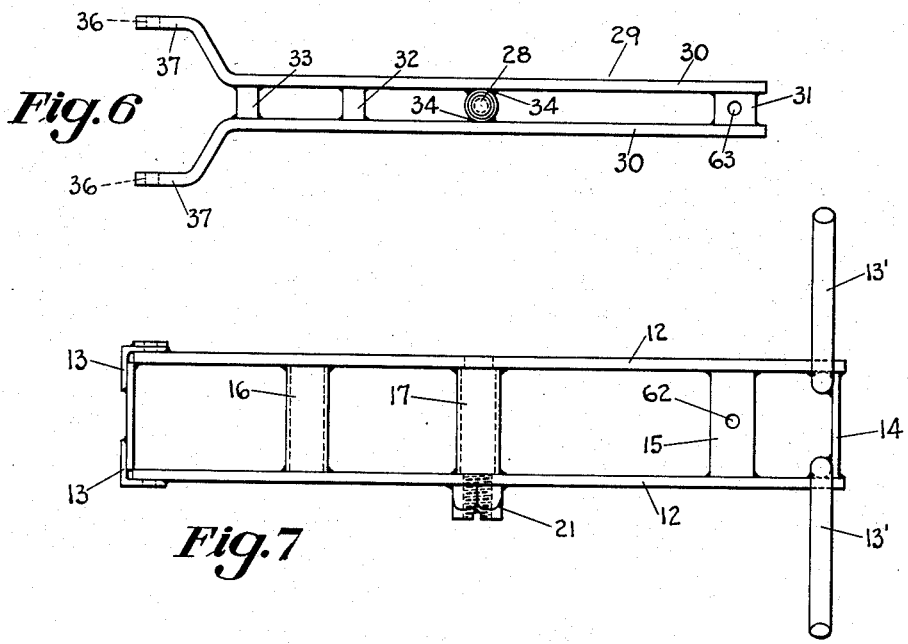
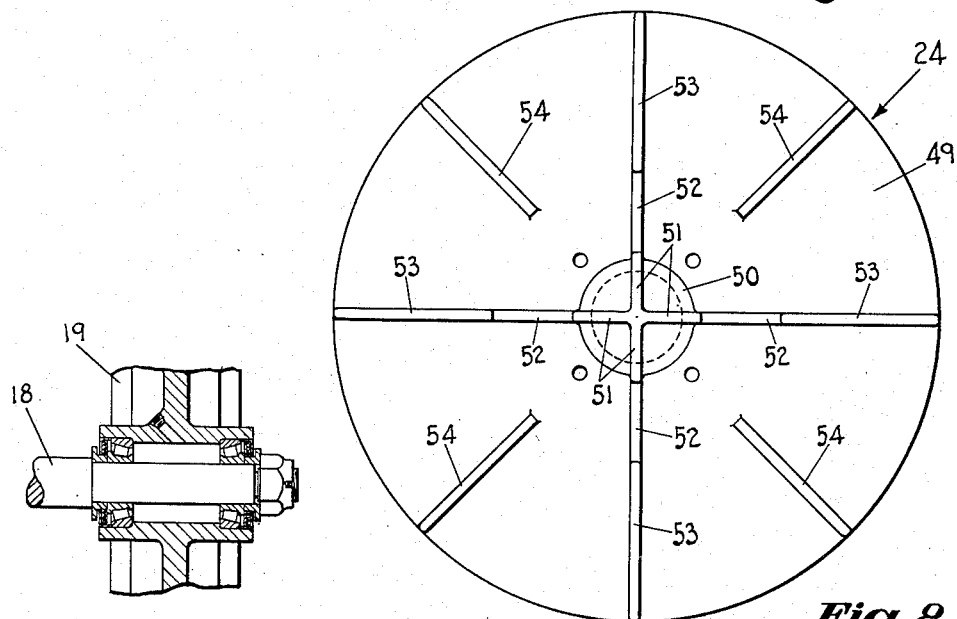
INVENTOR,
FRANKLIN E. ARNDT
BY Chas. M. Nissen,
ATTY.

Patented June 3, 1941

2,243,939

UNITED STATES PATENT OFFICE 2,243,939

SPREADER

Franklin E. Arndt, Galion, Ohio, assignor to The Galion Iron Works & Manufacturing Company, a corporation of Ohio Application November 5, 1937, Serial No. 173,000

20 Claims. (Cl. 275—8)

My invention relates to spreading apparatus adapted to be hitched to and towed behind a self-propelled dumping truck, and one of the objects of the invention is to improve and simplify a spreader of this type to reduce the cost of construction to a minimum.

Another object of the invention is the provision of improved and efficient mechanism for yieldingly holding a rotary spreading device in frictional engagement with the ground engaging supporting wheel.

Other objects of the invention will appear hereinafter, the novel features and combinations being set forth in the appended claims.

In the accompanying drawings,

Fig. 3 is a plan view of the spreader shown in Fig. 1;

Fig. 4 is a side elevational view of the spreader operatively connected to a self-propelled dumping truck having a tilting body adapted to be connected to the spreader so that when the forward end of the tilting body is lowered the spreader will be lifted up off the ground and supported for transportation;

Fig. 5 is an enlarged vertical sectional view showing in detail the mounting of the distributing disc;

Fig. 6 is a plan view of the auxiliary frame which supports the spreader disc;

Fig. 7 is a sectional plan view of the lower portion of the main frame;

Fig. 8 is a plan view of the spreader disc including its radial fins; and

Fig. 9 is a sectional view of the ground engaging driving wheel journaled to the axle which is stationary relative to the supporting frame.

Figure 1:
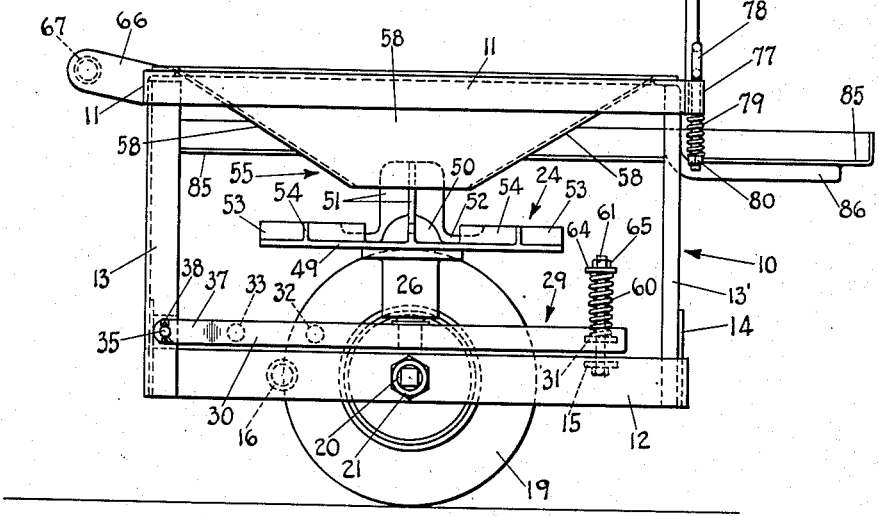
Fig. 1 is a side elevational view of the spreader embodying my invention.

Referring to the accompanying drawings, the spreader embodying my invention, comprises a supporting frame 10 having top angle iron members 11, bottom plate members 12, and upright angle iron members 13, 13', all of which members are rigidly connected together, preferably by welding.

While the top of the supporting frame is shown square in outline in Fig. 3, the bottom plate members 12 are shown in dotted lines in Fig. 3, spaced-apart only a short distance, and consequently the uprights 13, 13' at the ends of the plates 12 are correspondingly spaced-apart only a short distance at the upper and lower ends of such uprights rigidly connected to the square top 11 and rectangular bottom 12 of the frame 10.

A vertical reinforcing plate 14, a horizontal reinforcing plate 15 and a reinforcing pipe 16 connect the spaced-apart vertical plates 12, as shown in Figs. 1 and 7. An additional reinforcing pipe 17 also connects the spaced plates 12, as shown in Fig. 7. The reinforcements 14, 15, 16 and 17 are preferably welded at their ends to the plates 12, 12.

Figure 2:
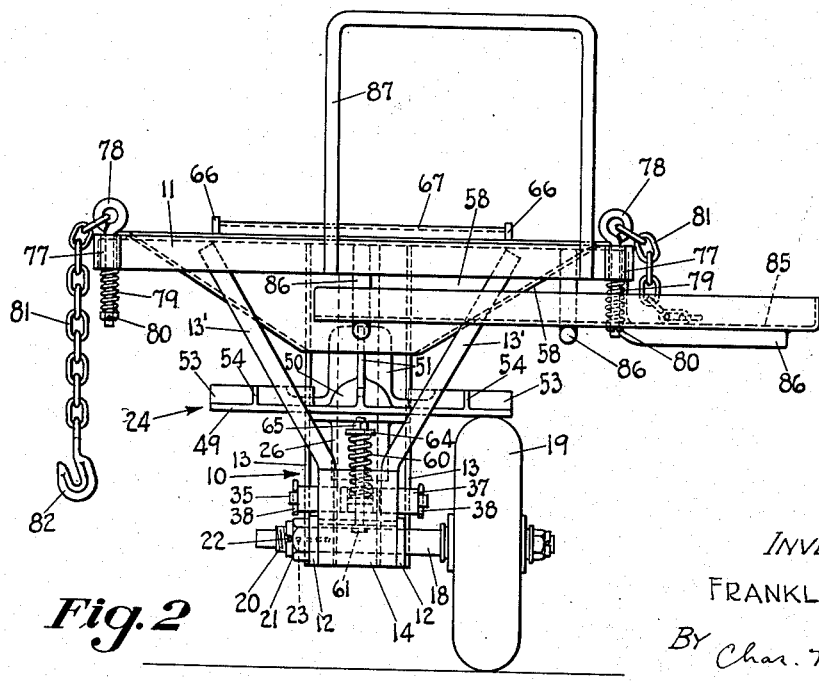
Fig. 2 is a rear end elevational view of the spreader shown in Fig. 1.

The reinforcing pipe or tubular connection 17 between the bottom plates or bars 12, 12 serves also to receive and support the axle 18 on the right-hand end of which is journaled the ground engaging wheel 19. That end of the axle 18 remote from the wheel 19 is screw-threaded at 20 through a nut 21 which is welded to the left-hand plate or bar 12, as viewed in Fig. 2. This plate with the nut 21 welded thereto is shown more clearly in Fig. 7. The axle 18 may be locked in adjusted position relative to the plates or bars 12 by means of a cotter pin 22 fitting in notches of the nut 21 and extending through one of the series of transverse perforations 23 in the axle 18, as shown in Fig. 2. When the cotter pin 22 is removed, the axle 18 may be rotated so that its screw-threaded portion 20 may be threaded through the fixed nut 21 and thereby adjust the position of the ground-engaging wheel relative to the frame and relative to the spreader disc 24 for a purpose hereinafter more fully explained.

The disc 24 is detachably mounted by means of the bolts 25, 25 on the hub 26 which is journaled by means of the thrust bearings 27, 27 on the upright bearing shaft 28 which is secured at its lower end, preferably by welding, to the auxiliary pivoted frame 29.

The auxiliary frame 29, as shown in Fig. 6, comprises spaced-apart parallel plates 30, 30 rigidly connected by the spacers 31, 32 and 33. Intermediate the spacers 31 and 32 the enlarged lower end of the upright bearing shaft 28 is welded to the spaced-apart plates or bars 30, 30, as shown at 34 in Fig. 6.

The left-hand end of the auxiliary frame 29 as viewed in Fig. 6 shows the bars 30, 30 spaced-apart a distance sufficient to embrace the outer sides of the vertical angle irons 13, 13'. A pivot pin 35 is adapted to extend through openings 36, 36 in the arms 37, 37 of the auxiliary frame 29. The pivot pin 35 also extends through perforations in the vertical angle iron members 13, 13 a short distance above the plates 12, 12 as shown in Fig. 1. Cotter pins 38 at the ends of the pivot pin 35 retain the latter in fixed relation to the main and auxiliary frames.

It should be particularly noted that the spreader disc 24 is carried by the auxiliary frame 29 and moves up and down bodily therewith. Mounted on the auxiliary frame and fixed to the bearing shaft 28 is a collar 39, and fixed to the bearing shaft 28 on top of the collar 39 is the lower roller bearing 40. A lubricant seal surrounding the collar 39 comprises a metal cup 41 secured to the inner lower end of the hub 26 and supporting a felt washer 42.

The ring bearing members 43, 44 fit against reverse shoulders on the inner side of the hub 26, as shown in Fig. 5. The upper ring bearing member 45 is slidable vertically on the bearing shaft 28 so that by means of the nut 46 on the upper screw-threaded end 47 of the bearing shaft 28 the spaced-apart thrust bearings may be taken up and the nut 46 then locked in adjusted position by means of the cotter pin 48.

The spreader disc structure is shown in Figs. 5 and 8 and comprises a plate 49 which is flat or plane on its underside and has radial fins integral therewith on its upper side. The center of the plate 49 is domeshaped at 50, as shown in Fig. 5, so as to provide ample space for the upper end of the bearing shaft 28 and the nut 46 thereon. By removing the bolts 25 the spreader disc may be detached from the hub 26 for the purpose of introducing lubricant in the chamber containing the thrust bearings shown in Fig. 5.

Projecting upwardly from the dome 50 are upwardly elongated fins 51, 51, radially disposed 90 degrees apart. Radiating from the lower ends of the fins 51 on the top of the plate 49 are fins 52, 52 of relatively shallow depth. The radial fins 52 are extended by the radial fins 53, 53 to the outer circular edge of the plate 49, as shown in Fig. 8. Intermediate the radial fins 53, 53 are additional radial fins 54, 54 of approximately the same lengths as the radial fins 53, 53. All of the radial fins 53 and 54 extend above the plate 49 the same distance. The inner ends of the radial fins 54 are spaced from the dome 50 while the inner ends of the radial fins 53 are connected to the center of the dome 50 by means of the shallow fins 52 and the upper elongated fins 51, as shown in Figs. 5 and 8.

The upwardly elongated fins 51 of the spreader disc 24 are adapted to extend upwardly through the open bottom of the hopper 55, the upper side of which is also open to receive the material dumped from the tilting body 56 of a self-propelled dumping truck 57, as illustrated in Fig. 4.

The hopper 55 may be composed of flat plates 58, 58 with their upper edges bent into position for securing by means of the bolts 59, 59 to the tops of the angle iron frame members 11, 11, as shown in Fig. 3. The hopper is therefore in the form of an inverted truncated pyramid with the edges of the open bottom located above the shallow radial fins 52, 52, as shown in Fig. 2. The outer ends of the radial fins 51 are spaced from the edges of the bottom opening of the hopper, and ample space is provided, as shown in Fig. 3, for free flow of the material from the hopper 55 to the top of the rotary spreader disc 24. By reason of the upward projection of the fins 51 into the lower portion of the hopper 55, a stirring action is afforded on the material at the lower portion of the hopper so that any tendency of discontinuance of flow of material from the hopper will be avoided. Furthermore, such stirring action will produce a more uniform flow of the material so as to be in accordance with the speed of travel of the towing vehicle to which the spreader is connected.

By referring to Fig. 3 it will be seen that the fins 51 where they project upwardly into the discharge opening in the bottom of the hopper, take up a relatively small amount of space. In other words, the area of the discharge opening is decreased but little because the agitator is composed of radial fins. Moreover, while the large area of the discharge opening is maintained notwithstanding the presence of the agitator, the upstanding radial fins 51 have a radial throwing action which becomes effective as soon as the material leaves the discharge opening in the bottom of the hopper, in starting the spreading of the discharged material. It will thus be seen that the fins 51 act as spreading fins as soon as the material is discharged from the hopper and even before such discharged material reaches the top of the spreader disc.

As shown in Fig. 9, the ground engaging wheel 19 is journaled to the right-hand end of the axle 18, as shown in Fig. 2, in such a manner that when the axle 18 is adjusted relative to the plates or bars 12, the periphery of the rubber-tired wheel 19 will frictionally engage the flat bottom of the spreader disc 24 at an adjusted distance from its center of rotation. It will thus be seen that when the axle 18 is adjusted axially relative to its support, the speed of rotation of the spreader disc 24 may be varied. Whenever the speed of rotation of the spreader disc 24 is varied, the speed of rotation of the stirring and throwing fins 51 is likewise adjusted. The nearer to the center of the spreader disc 24 the ground engaging driving wheel 19 is adjusted, the faster the disc will be rotated and the greater the area will be over which the material is spread. The increase of rotation of the disc will also effect increased rotation of the stirring action by means of the fins 51, and consequently the faster the material can flow from the hopper. The spreader disc may be made of metal, such as iron, or other material, and it lower flat side may have attached thereto a layer of friction material, but I prefer the rubber-tired ground engaging driving wheel 19 frictionally engaging the lower flat metal side of the rotary spreader disc 24.

In order to hold the lower flat side of the rotary disc 24 yieldingly against the periphery of the rubber-tired ground engaging driving wheel 19, a compression spring 60 is mounted at that end of the auxiliary frame 29 remote from the pivot 35 so as to urge the auxiliary frame 29 down toward the reinforcing plate 15 which connects the plates 12. The spring 60 surrounds a bolt 61 the lower end of which extends through an opening 62 in the spacer 15 between the plates 12. The bolt extends also through an opening 63 in the spacer 31 between the plates 30. The upper end of the bolt 61 extends through a washer 64 on top of which is a nut 65, by means of which the tension in the spring may be adjusted. Inasmuch as the spring 60 urges the right-hand end of the auxiliary frame 29, as viewed in Fig. 1, in a downward direction, the bearing shaft 28 and nut 46 shown in Fig. 5 transmit this downward force to the spreader disc so as to hold the latter yieldingly against the periphery of the ground engaging driving wheel 19. Any irregular periphery of the wheel 19, such as that caused by road material clinging thereto, will not interfere with maintenance of frictional engagement between the periphery of the wheel and the bottom of the spreader disc.

There is of course inherent in the construction disclosed, a floating action of the disc 24 on the periphery of the wheel 19 by reason of the weight of the disc and the parts moving up and down bodily therewith. But I prefer not to omit the spring because the inclusion of the spring is more effective in keeping the bottom of the disc 24 in frictional driving engagement with the periphery of the wheel 19 and the spring mounting acts to limit the upward bouncing of the disc and therefore keeps the upper ends of the fins 51 centralized in the hopper discharge opening.

The hitching mechanism for connecting the spreader to a self-propelled dumping truck is shown in Figs. 3 and 4 and comprises a drawbar structure composed of spaced-apart vertical plates 66, 66 rigidly connected to the forward upper edge of the main frame, with the forward ends of the plates 66 rigidly connected together by means of the pipe 67. The supporting plate 68 may be connected to the rear end of the frame 69 by means of the lag screws 70 extending through the perforations 71 in the plate 68. Extending rearwardly from the plate 68 are two pairs of vertically spaced horizontal bracket plates 72, 72 connected by vertical spacer plates 73, 73 which serve to act as abutments for the front side of the pipe 67 when the latter is located between the bracket plates 72, 72, as shown in Figs. 3 and 4. The drawbar plates 66, 66 are preferably located outside of the bracket plates 72, as shown in Fig. 3. Coupling pins 74 are adapted to be inserted through the vertically aligned openings 75, 75 in the spaced-apart bracket plates 72, 72. The coupling pins may be connected by means of chains 76 to the truck frame plate 68.

At the rear of the top edge of the spreader and at the corners theerof are located spaced-apart sockets 77, 77 for receiving the screw eyes 78, 78 which project downwardly a sufficient distance for receiving the compression springs 79, 79 between the nuts 80, 80 and the bottom of the rear top frame member 11, as shown in Fig. 2. By means of the nuts 80 the tension of the springs 79 may be adjusted and the nuts then locked in adjusted position to the screw eyes 78.

Chains 81, 81 are connected to the screw eyes 78, 78 and provided at their ends with hooks 82 which are adapted to be connected to the chains 83 mounted on the rear end of the truck body 56, as shown in Fig. 4. The chains 83 are spaced-apart a distance equal to the spacing of the sockets 77, 77. It can readily be seen by referring to Fig. 4 that when the forward end of the truck body 56 tilts downwardly on its pivot 84, the chains 81, 83 will effect lifting of the driving wheel 19 from the ground. The springs 79 will act as shock absorbers both when the spreader is lifted from the roadway and during transportation of the spreader while up off the roadway.

During operation the chains 81 and 83 are disconnected. The truck body 56 is tilted to such an angle as to regulate the flow of material therefrom into the hopper 55, and to facilitate the flow of material from the truck body 56 an attendant may use a raking tool while he stands on the platform 85 which is secured by means of the brackets 86, 86 to one side and a portion of the rear of the main frame. An inverted U-shaped rod 87 is secured at its ends to the rear top edge of the main frame, and the upper horizontal portion of such rod may be used as a rail to be grasped by such attendant with one hand while he operates the rake with the other hand.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a material spreader, the combination with a supporting frame having a widely expanded top portion and an elongated narrow bottom portion, of a hopper mounted in said top portion, a rotary distributor mounted on said narrow portion beneath said hopper, and a single ground engaging wheel mounted on said narrow portion and spaced from one side thereof with its periphery in driving connection with said rotary distributor, said single ground engaging wheel serving as the sole ground support for the frame and parts mounted thereon.

2. In a material spreader, the combination with a main frame, of a supplemental frame movable relatively thereto, a rotary spreading device mounted on said supplemental frame to move bodily therewith and for rotation relatively to both of said frames on an upright axis, a ground engaging wheel mounted on said main frame in position to frictionally engage the under side of said spreading device to effect driving thereof when said ground engaging wheel is rotated by travel along the ground surface, and means acting directly on said supplemental frame to yieldingly maintain frictional driving connection between said ground engaging wheel and said rotary spreading device.

3. In a material spreader, the combination with a main frame, of a supplemental frame mounted on said main frame for movement relatively thereto, a material distributing device comprising a plate mounted on said supplemental frame for rotation relatively thereto on an upright axis, a ground engaging wheel mounted on said main frame with its periphery in frictional driving engagement with the underside of said plate to effect rotation of the latter, and means between said frames for holding said plate in such frictional driving engagement.

4. In a material spreader, the combination with supporting framework, of a ground engaging wheel mounted thereon, a rotary distributor plate having its underside in driving engagement with the periphery of said wheel, and means comprising a spring spaced from the distributor to yieldingly hold such distributor plate underside in such driving engagement.

5. In a spreader, the combination with supporting framework, a journal bearing projecting from one side of said framework, a ground engaging wheel journaled on said bearing to occupy a position at one side of said framework and spaced laterally therefrom, and a material spreader mounted on said framework for rotation on an upright axis and in position for frictional driving engagement with the periphery of said ground engaging wheel.

6. In a material spreader, the combination with supporting framework, of a material spreading device mounted on said frame for rotation relatively thereto on an upright axis, a bearing adjustably secured to said framework so as to project varying distances from one side of the framework in accordance with the adjustment made, and a ground engaging wheel journaled on the outer end of said bearing in position to frictionally engage said spreading device to drive the same as the wheel travels along the ground surface.

7. A road material spreader comprising a main frame, a ground engaging wheel pivotally connected to said main frame, a supplemental frame pivotally connected at one end to said main frame, an upright bearing shaft secured to said supplemental frame intermediate the ends of the latter to project upwardly therefrom, a rotary spreading device journaled on said upright bearing shaft with the underside of the spreading device in frictional driving engagement with said ground engaging wheel, and resilient means between the main frame and the other end of said supplemental frame to yieldingly urge said spreading device against said wheel.

8. In a road material spreader, the combination with relatively narrow supporting framework, of a ground engaging wheel pivotally connected thereto to occupy a position spaced from one side thereof, a rotary spreading device mounted on said relatively narrow supporting framework with its periphery projecting laterally therefrom and for rotation on an upright axis, the construction and arrangement being such that the periphery of said ground engaging wheel shall be in frictional driving engagement with the underside of said rotary spreading device, and a hopper carried by said framework with its discharge opening above said rotary spreading device.

9. In a material spreader adapted to be connected to and hauled behind a dumping truck, the combination with a main frame, of a hopper carried thereby in position to receive material from the dumping truck, said hopper having a discharge opening in its bottom, a supplemental frame, a rotary distributor mounted on said supplemental frame for rotation relatively thereto on an upright axis while confined against up or down movement relatively thereto, a ground engaging wheel connected to said frame in direct frictional driving engagement of its periphery with said rotary distributor, means for mounting said supplemental frame on said main frame for bodily up and down movement of the distributor relatively to said wheel, and resilient means between said frames to yieldingly maintain the frictional driving engagement between the periphery of said ground engaging wheel and said rotary distributor.

10. In a material spreader, the combination with a main frame, of a supplemental frame mounted thereon for limited movement relatively thereto, a hopper having a discharge opening in its bottom, a rotary distributor mounted on said supplemental frame for rotation relatively thereto on an upright axis and bodily movement therewith, a ground engaging wheel with its periphery in direct frictional driving connection with the under side of said rotary distributor, and means comprising a spring mounted between said frames for yieldingly maintaining the frictional driving connection between said ground engaging wheel and said distributor.

11. In a spreader, the combination with a frame, of a hopper having a bottom discharge opening, a material spreader positioned below said hopper to receive material from said discharge opening, a ground engaging wheel, an axle on which said ground engaging wheel is journaled, and mechanism connecting said axle to said frame for axial adjustment relative thereto to afford adjustment of said ground engaging wheel relative to said spreader to vary the speed ratio between the wheel and the said material spreader.

12. In a material spreader, the combination with a supporting frame, of a rotary spreader mounted thereon, an axle having a threaded portion, a ground engaging wheel journaled on said axle, mechanism comprising a threaded member secured to said frame for supporting the axle in position for said wheel to have driving connection with said rotary spreader, said wheel being adjustable toward and from the axis of rotation of said rotary spreader by turning said axle to cause its threaded portion to move the axle axially relative to said frame, and means for locking the axle in adjusted position relative to said frame with the wheel in driving connection with said rotary spreader.

13. As an article of manufacture, a frame structure comprising spaced side bars connected by a tubular cross-brace, and a nut secured to one of said side bars at one end of said tubular cross-brace, the latter being adapted to receive an axle having a threaded portion which said nut is adapted to receive for adjustment of the axle axially.

14. As an article of manufacture, a frame comprising spaced side bars having a plurality of connecting cross-braces between them, one end of said frame being adapted for pivotal connection to a support, and a bearing shaft secured to one of said cross-braces intermediate the ends of said frame, said shaft being adapted to have journaled thereon a rotary spreader.

15. In a spreader, the combination with a frame, of a ground engaging wheel, a spreader disc resting on and driven by said wheel, and means for connecting said wheel to said frame with the periphery in driving engagement with said disc, said conecting means comprising mechanism for adjusting the said wheel relative to the axis of said disc to effect variation in driving speed ratio between said wheel and said disc.

16. In a material spreader, the combination with supporting framework, of a ground engaging wheel, a material spreading device mounted on said framework for rotation relatively thereto on an upright axis, and means comprising a journal bearing for connecting said wheel to said framework with the periphery of said wheel in driving engagement with said spreading device, said connecting means comprising mechanism for adjusting said wheel relative to the axis of said spreading device to effect adjustment in the driving speed ratio between said wheel and said spreading device.

17. In a material spreader, the combination with supporting framework, of a material spreading device mounted on said framework for rotation relatively thereto on an upright axis, a ground engaging wheel in peripheral driving engagement with said spreading device, an axle having a journal bearing for said wheel, and mechanism on said framework for supporting said axle for axial adjustment to secure adjustment of said journal bearing to in turn secure adjustment of said wheel relative to the aforesaid upright axis of said spreading device to vary the speed ratio between the said wheel and said spreading device.

18. A spreader for trucks comprising the combination with a structure having a hopper provided with a discharge outlet, means for hingedly connecting the structure to said truck in position for said compartment to receive bulk material from the body of the truck, a supporting wheel for the structure, a rotary spreader beneath said discharge outlet, the under side of the spreader frictionally engaging said wheel for actuation thereby, means pivotally connected to said structure for carrying said spreader, and mechanism comprising a spring to yieldingly press the latter against the periphery of said wheel.

19. The combination with a truck having a dump body, of a main frame hingedly connected to the rear end of said truck, a hopper mounted in said frame in position to receive bulk material from said dump body, said hopper having a bottom discharge opening, a supporting wheel connected to the structure and having a resilient tread, a rotatable spreading device beneath said bottom discharge opening, the underside of said spreading device frictionally engaging and adapted to be actuated by the tread portion of said wheel, and means comprising a supplemental frame for carrying said spreading device and pivotally connected to said main frame to enable the under side of said spreading device to rest against the tread portion of said wheel.

20. In a spreader, the combination with a main frame, of a ground engaging wheel connected thereto to support the same, a rotary spreader having its underside in frictional driving engagement with the periphery of said ground engaging wheel, a supplemental frame pivoted to said main frame, mechanism for rotarily mounting said spreader on said supplemental frame while compelled to move up and down with the latter, mechanism comprising a spring connecting said supplemental frame to said main frame to yieldingly hold said spreader in driving engagement with said wheel, and means for adjusting the tension in said spring to vary the pressure exerted thereby.

FRANKLIN E. ARNDT.